United States Patent
Li et al.

(10) Patent No.: US 10,181,804 B1
(45) Date of Patent: Jan. 15, 2019

(54) SOFT-START CIRCUIT FOR SWITCHED RESONANT POWER CONVERTERS

(71) Applicant: Linear Technology Holding LLC, Norwood, MA (US)

(72) Inventors: Jian Li, San Jose, CA (US); Jindong (Henry) Zhang, Fremont, CA (US)

(73) Assignee: Linear Technology Holding LLC, Norwood, MA (US)

( * ) Notice: Subject to any disclaimer, the term of this patent is extended or adjusted under 35 U.S.C. 154(b) by 0 days.

(21) Appl. No.: 15/675,632

(22) Filed: Aug. 11, 2017

(51) Int. Cl.
*H02M 1/36* (2007.01)
*H02M 7/48* (2007.01)

(52) U.S. Cl.
CPC ............ *H02M 7/4807* (2013.01); *H02M 1/36* (2013.01); *H02M 2007/4815* (2013.01); *H02M 2007/4818* (2013.01)

(58) Field of Classification Search
CPC ........... H02M 1/36; H02M 2001/0058; H02M 7/4807; H02M 2007/4815
See application file for complete search history.

(56) References Cited

U.S. PATENT DOCUMENTS

| 6,154,375 | A | 11/2000 | Majid et al. | |
|---|---|---|---|---|
| 7,078,883 | B2 * | 7/2006 | Chapman | H02M 1/36 323/232 |
| 7,742,318 | B2 * | 6/2010 | Fu | H02M 3/33592 363/16 |
| 8,503,203 | B1 | 8/2013 | Szczeszynski et al. | |
| 2003/0001552 | A1 | 1/2003 | Fujita et al. | |
| 2009/0189586 | A1 | 7/2009 | Tiew | |
| 2009/0322384 | A1 | 12/2009 | Oraw et al. | |
| 2011/0309809 | A1 | 12/2011 | Rao et al. | |
| 2012/0112724 | A1 | 5/2012 | Nishida | |
| 2013/0201726 | A1 | 8/2013 | Hu et al. | |
| 2014/0021916 | A1 | 1/2014 | Bilezikjian et al. | |
| 2014/0210393 | A1 | 7/2014 | Kanekawa et al. | |

(Continued)

OTHER PUBLICATIONS

"PhotoMOS for Various Applications," retreived on Aug. 29, 2017 from https://www3.panasonic.biz/ac/e/control/relay/photomos/app_circuits/index.jsp, 7 pages.

(Continued)

*Primary Examiner* — Jue Zhang
*Assistant Examiner* — Jye-June Lee
(74) *Attorney, Agent, or Firm* — Schwegman Lundberg & Woessner, P.A.

(57) ABSTRACT

A switched resonant power converter includes multiple switching transistors, a resonant circuit comprising a capacitor and an inductor, and an auxiliary soft-start bypass circuit that bypasses a default switching path that includes a first switching transistor of the switching transistors, and provides an alternative path through an impedance element. A corresponding control circuit is configured to switch between an operational mode in which the default switching path is periodically activated while the alternative path is deactivated to provide a first frequency-responsive power through the resonant circuit, and a soft-start mode in which the alternative path is periodically activated while the default switching path is deactivated to provide a second frequency-responsive power through the resonant circuit.

19 Claims, 9 Drawing Sheets

(56) References Cited

U.S. PATENT DOCUMENTS

| | | | |
|---|---|---|---|
| 2014/0254208 A1 | 9/2014 | Dai et al. | |
| 2014/0266099 A1 | 9/2014 | Ku et al. | |
| 2015/0008894 A1 | 1/2015 | Cannankurichi et al. | |
| 2015/0084404 A1 | 3/2015 | Hashim et al. | |
| 2015/0155895 A1 | 6/2015 | Perreault et al. | |
| 2015/0207401 A1 | 7/2015 | Zhang et al. | |
| 2015/0270775 A1 | 9/2015 | Ma | |
| 2015/0318794 A1 | 11/2015 | Hansson | |
| 2016/0261185 A1 | 9/2016 | Lidsky et al. | |
| 2017/0085177 A1 | 3/2017 | Jimenez Pino et al. | |
| 2017/0353105 A1 | 12/2017 | Solie et al. | |
| 2018/0006550 A1* | 1/2018 | Kao | H02M 1/36 |

OTHER PUBLICATIONS

International Search Report and Written Opinion from PCT/US2017/046797, dated Nov. 2, 2017, 10 pages.

\* cited by examiner

SOFT-START CIRCUIT FOR SWITCHED RESONANT POWER CONVERTERS

BACKGROUND

The disclosure relates generally to resonant devices and, more particularly, to the start-up of resonant power converter circuits.

Resonant power converter circuits provide efficient power solutions for power supply design. A resonant power converter circuit is a type of power converter that provides direct current to direct current (DC-DC) conversion based on resonant current oscillation at a specific frequency. A switched resonant power converter contains one or more switching elements (e.g., one or more transistors) and reactive elements (e.g., capacitors and inductors) that, in connection with a periodic switching of the switching elements, generates a sinusoidal voltage or current. This voltage may then be rectified to produce a stable output voltage. Types of resonant power converters include a series resonant converter, a parallel resonant converter, and a series-parallel resonant converter.

A shortcoming of resonant converters is that, during start up, the converter may produce a high in-rush current and high voltage that may shorten the average life of the components that make up the converter and/or power supply in which the converter is implemented.

Accordingly, what is needed is a mechanism for effectively limiting high in-rush current and high voltage within a resonant converter during a power-up of the converter, without adding considerable power loss, solution size, cost and complexity.

SUMMARY

A switched resonant power converter according to various implementations includes a plurality of switching transistors connected in series, and a resonant circuit comprising a capacitor and an inductor, with the resonant circuit being connected at a first node linking two of the connected plurality of switching transistors to receive a switched power from the switching transistors. The resonant power converter may include an auxiliary soft-start bypass circuit that includes one or more auxiliary transistors and an impedance element. The auxiliary soft-start bypass circuit provides an auxiliary circuit path in parallel to a first switching transistor of the plurality of switching transistors and through the impedance element to the resonant circuit when the auxiliary soft-start bypass circuit is activated and the first switching transistor is deactivated. A control circuit is configured to switch between (1) an operational mode in which the auxiliary soft-start bypass circuit is deactivated and the plurality of first switching transistors are switched according to a switching cycle to provide a first frequency-responsive power through the resonant circuit, and (2) a soft-start mode in which the auxiliary soft-start bypass circuit is activated and one or more auxiliary transistors are switched according to the switching cycle in place of one or more of the plurality of first switching transistors to provide a second frequency-responsive power through the resonant circuit.

Other aspects disclosed herein include corresponding methods, systems, apparatuses, and electronic device products for implementation of the switched resonant power converter. It is understood that other configurations will become readily apparent to those skilled in the art from the following detailed description, wherein various exemplary configurations and implementations are shown and described by way of illustration.

BRIEF DESCRIPTION OF THE DRAWINGS

The accompanying drawings are presented to aid in the description of example aspects and are provided solely for illustration of embodiments and not limitation thereof.

DETAILED DESCRIPTION

Aspects and features, and exemplary implementations practices and applications are disclosed in the following description and related drawings. Alternatives to disclosed examples may be devised without departing from the scope of disclosed concepts.

The term "converter," as used herein, encompasses but is not limited to any one of, or any combination of "regulator," "DC regulator," "voltage regulator," "DC voltage regulator," "DC-DC converter," "DC converter" and "converter," and includes, but is not limited to, the plain meaning of any one or more of these terms.

Figure 1A:
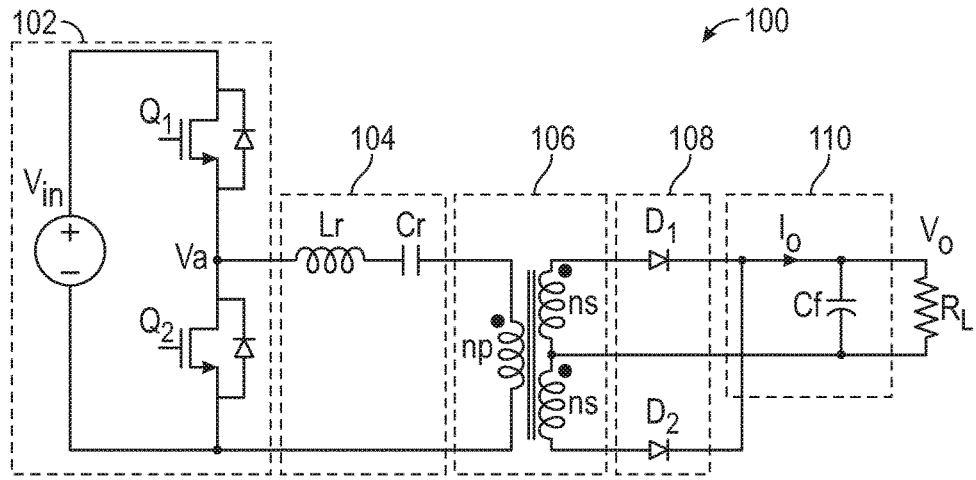
FIGS. 1A, 1B, and 1C are diagrams of exemplary switched resonant power converters.
Figure 1B:
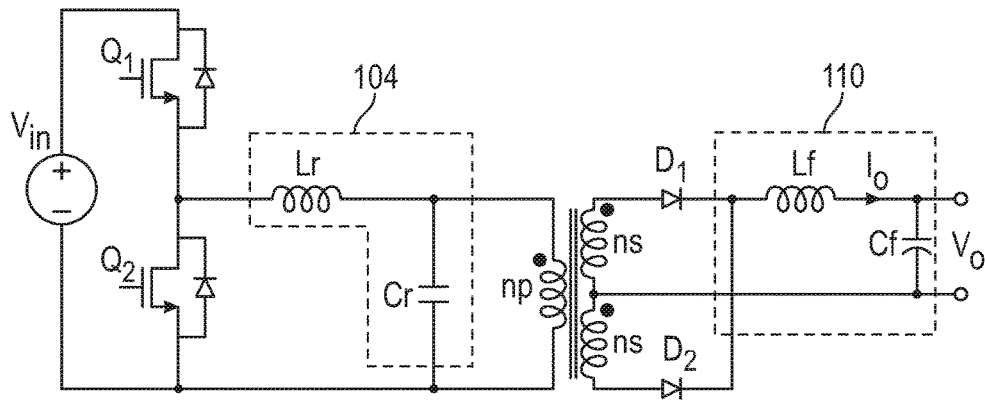
Figure 1C:
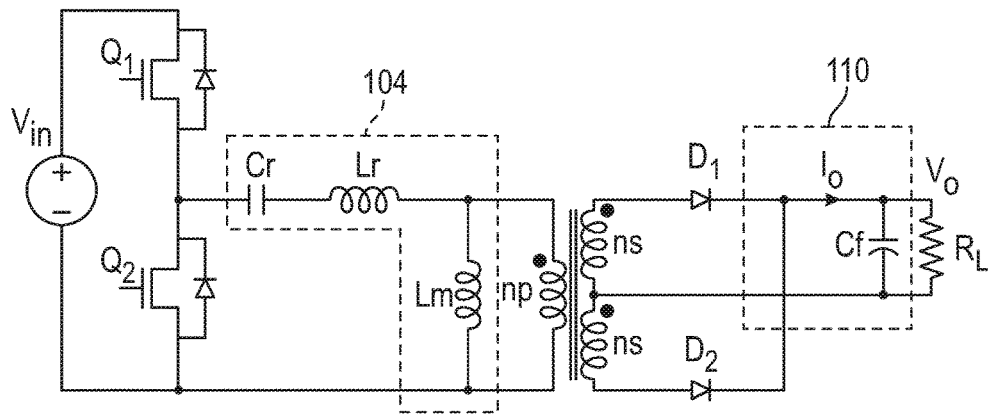

FIGS. 1A, 1B, and 1C are diagrams of exemplary switched resonant power converters. FIG. 1A depicts a first exemplary half-bridge series resonant converter 100. In the depicted example, resonant power converter 100 includes a switching bridge 102, which includes a pair of switching transistors Q1 and Q2 that are switched on an off complimentary to each other according to a switching cycle (e.g., at a predetermined switching frequency and duty cycle) to drive a resonant tank circuit 104. For example, Q1 and Q2 may be switched at a 50% duty cycle, wherein each transistor is switched on or off in phase opposition for exactly the same time period. Resonant tank circuit 104 includes one or more inductors Lr and one or more capacitors Cr that are energized by each pulse from switching bridge 102. In this regard, the periodic square-wave voltage provided by switching bridge 102 causes resonant tank 104 to oscillate at a resonant frequency Fr based on the values of Lr and Cr.

Power flow through resonant tank circuit 104 may be controlled by changing the switching frequency of Q1 and Q2 (e.g., by changing the frequency of the square wave voltage), changing the duty cycle, or both. For example, power may be increased or decreased while the duty cycle is fixed by changing the frequency closer to or further from the resonant frequency Fr of tank circuit 104 (e.g., as defined by the specific configuration of Cr and Lr).

According to various implementations, resonant tank 104 outputs a resonant sinusoidal current that may be scaled by a transformer circuit 106 and rectified by a rectifier circuit 106. In the depicted example, rectifier circuit 108 includes a pair of diodes D1 and D2 in a half-bridge rectifier configuration. A filter circuit 110 further filters the rectified AC current to produce a stable DC voltage Vo across a load $R_L$ (not shown in FIG. 1B). Rectifier circuit is shown coupled to resonant tank circuit 104 via transformer circuit 106. While filter circuit 110 is depicted as including an output capacitor Cf in FIG. 1A, filter circuit 110 may include any configuration described herein for filtering the output voltage Vo.

The gain of resonant power converter 100 may be a function of a gain of the switching bridge 102, a gain of resonant tank circuit 104, and a gain of transformer circuit 106 (e.g., according to a turn ratio). For example, wherein the switching transistors Q1 and Q2 are in a half-bridge configuration, the gain of switching bridge 102 may be 0.5 or Vin/2. Wherein, as in the depicted example, inductor Lr and capacitor Cr are in series with a load (represented by, e.g., transformer circuit 106 and/or the circuit(s) that include $R_L$), resonant tank circuit 104 may provide a gain equal to or less than 1, with unity gain occurring at a resonant frequency of the tank circuit. The gain of transformer circuit 106 may be a function of the primary side to secondary side turn ratio np:ns.

In some implementations, resonant power converter 100 may operate as a step down or buck converter when operating above the resonant frequency Fr of tank circuit 104 (e.g., in a configuration of FIG. 1A or 1C). Similarly, converter 100 may operate as a step up or boost converter when operating below resonant frequency Fr (e.g., in a configuration of FIG. 1B or 1C).

FIG. 1B depicts a second exemplary half-bridge parallel resonant converter. In the depicted example, resonant tank circuit 104 includes an inductor Lr and a capacitor Cr, with capacitor Cr in parallel with a load (represented by, e.g., transformer circuit 106 and/or the secondary circuit, including $R_L$) when Q2 is switched on. In this configuration, resonant power converter 100 may be operated without a load. In the depicted example, filter circuit 110 includes an inductor Lf and output capacitor Cf in a low pass filter configuration. However, filter circuit 110 may include any configuration described herein for filtering the output voltage Vo.

FIG. 1C depicts a third exemplary half-bridge LLC resonant converter. The example converter 100 is a combination of previously-described first and second exemplary resonant power converters of FIGS. 1A and 1B. In the depicted example, resonant tank circuit 104 includes a capacitor Cr, first inductor Lr, and a second inductor Lm. Capacitor Cr and inductor Lr are connected in series and, when Q2 is switched on, further connected in parallel with Lm. In this configuration, resonant tank circuit 104 may operate at resonance, with or without a load. Other configurations are possible. For example, Lm may be replaced with a capacitor Cm, forming an LCC resonant converter (not shown).

FIG. 1C is depicted providing a regulated Vo to load $R_L$. While FIG. 1C implements the filter configuration of FIG. 1A, the converter of FIG. 1C may implement the filter circuit configuration of FIG. 1B. The filter circuit of a respective resonant power converter described herein may include any configuration described herein for filtering the output voltage Vo. It is understood that various secondary-side configurations of the resonant power converters disclosed herein, each of which includes a secondary side of a transformer circuit, a rectifier circuit, and a filter circuit, are interchangeable with the various primary-side configurations disclosed herein, which include a primary side of a transformer circuit, a resonant tank circuit, and a switching bridge.

According to various aspects, a resonant power converter, such as those depicted in FIGS. 1A-C, may produce high reactive stress during a start-up of the converter. For example, resonant power converter 100 of FIG. 1A may be configured to convert a Vin of 48 volts to a Vo of 6 volts. In this configuration, Lr may be about 4.24 micro Henrys (uH) and Cr may be about 100 nano Farads (uF), and the switching frequency may be set to 300 kilohertz (kHz), with a primary side to secondary side turn ratio (np:ns) of 4:1. In this configuration, a start-up of the converter may produce a capacitor voltage Vcr as high as 130 volts and a current iLcr across the inductor of more than 20 amps.

As will be described further, an auxiliary soft-start bypass circuit may be implemented in which an auxiliary circuit path in parallel to one or more of the switching transistors of switching bridge 102 is provided when the auxiliary soft-start bypass circuit is activated and a corresponding switching transistor(s) is deactivated. The soft-start bypass circuit provides, among other features and benefits, a technical solution to the previously described high capacitor voltage on the capacitor, and high current across the inductor during start-up.

Figure 2:
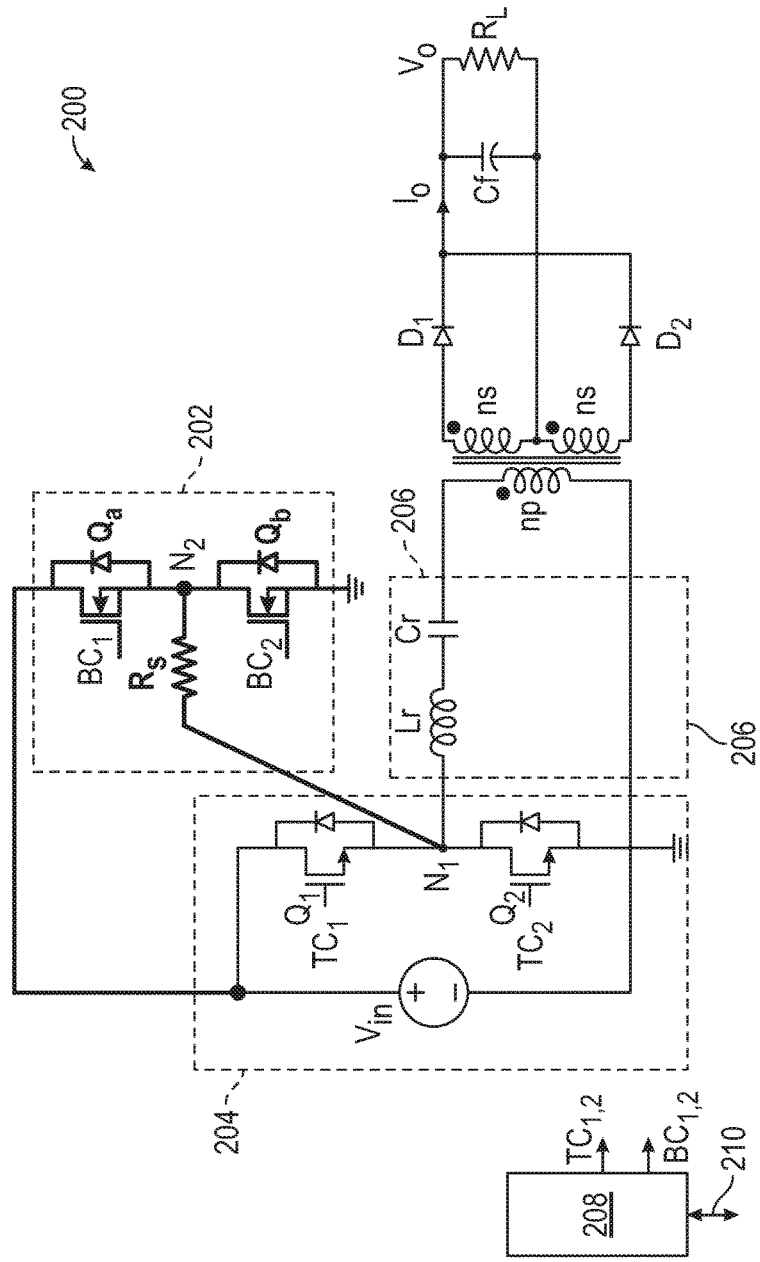
FIG. 2 is a diagram of an exemplary half-bridge soft start-up switched resonant power converter, including an exemplary half-bridge bypass drive circuit.

FIG. 2 is a diagram of an exemplary half-bridge soft start-up switched resonant power converter 200, including an exemplary half-bridge bypass drive circuit 202. Resonant power converter 200 includes a switching bridge 204 with switching transistors Q and Q2 connected in series between a first terminal of a power source Vin (e.g., its cathode) and second terminal of the power source (e.g., its anode). In the depicted example, the second terminal is a ground. Vin may be a direct current (DC) power source, providing a DC voltage. Resonant power converter 200 includes a resonant circuit 206 connected between the second terminal (e.g., ground) and a first node N1 which links switching transistors Q1 and Q2. Resonant circuit 206 is depicted as a series resonant circuit with an inductor Lr and a capacitor Cr in series and, in normal operational mode, may operate as described with regard to tank circuit 104 of FIG. 1A.

In accordance with various implementations, bypass drive circuit 202 includes two auxiliary transistors, Qa and Qb, and an impedance element Rs. Bypass drive circuit 202 is connected in parallel with switching bridge 204, between the first and second terminals (e.g., between Vin and ground). In this regard, impedance element Rs is connected between node N1 and a node N2 which links Qa and Qb. An opposite side of impedance element Rs may be connected at a node N3 linking Vin and Qa (e.g., at its drain). Auxiliary soft-start bypass drive circuit 202 provides an auxiliary circuit path, in parallel to and bypassing switching transistor Q1, through impedance element Rs to the resonant circuit, when Qa of bypass circuit 202 is activated and Q1 is deactivated. While impedance element Rs is shown as a resistor, impedance element Rs may be replaced with an inductor or a combination of one or more resistors and one or more inductors.

Resonant power converter 200 may include, as depicted in FIG. 2, a control circuit 208 configured to switch the converter between an operational mode in which auxiliary soft-start bypass drive circuit 202 is deactivated and the Q1 and Q2 of switching bridge 204 are switched according to a switching cycle (e.g., to provide a first frequency-responsive power through the resonant circuit 206), and a soft-start mode in which the auxiliary soft-start bypass drive circuit 202 is activated, and Qa and Qb are switched according to the switching cycle in place of Q1 and Q2 (e.g., to provide a second frequency-responsive power through resonant circuit 206). Control circuit 208 may switch auxiliary transistor Qa according to the switching cycle in place of switching transistor Q1, and may switch auxiliary transistor Qb according to the switching cycle in place of switching transistor Q2.

According to various implementations, control circuit 208 may be a pulse-width modulation (PWM) controller that generates PWM signals to switching bridge 204 to switch the switching transistors (e.g., Q1 and Q2) of the bridge on and off according to a set switching frequency and/or duty cycle. In this regard, control circuit 208 may include an input/output (I/O) interface 210, and may be programmed (e.g., before start-up of the converter) with a predetermined switching frequency and/or duty cycle, for example, by way of the I/O interface. Switching transistor control signals TC1 and TC2 may be transmitted at a first voltage by control circuit 208 to the gates of switching transistors Q1 and Q2 to switch on Q1 and Q2, respectively, and transmitted at a second voltage (e.g., zero volts) to switch off the transistors. Likewise, bypass control signals BC1 and BC2 may be transmitted by control circuit 208 at a first voltage to switch on switching transistors Qa and Qb, respectively, and transmitted at a second voltage to switch off the transistors. When control circuit 208 is actively transmitting control signals TC the switching bridge 204 and/or its switching transistors Q1 and/or Q2 are considered to be in the active state. When control circuit 208 is actively transmitting control signals BC the bypass drive circuit 202 is considered to be in the active state. When no signals are transmitted to a component (or transmitted at the second voltage) the corresponding component(s) is considered to be in the deactivated state.

While resonant power converter 200 is depicted as implementing the filter configuration of FIG. 1A, resonant power converter 200 may alternatively implement the filter circuit configuration of FIG. 1B or 1C. In this regard, the resonant power converters disclosed herein (e.g., in FIGS. 2 and 4-7) may include any configuration described herein for filtering the output voltage Vo. It is understood that various secondary-side configurations of the resonant power converters disclosed herein, each of which includes a secondary side of a transformer circuit, a rectifier circuit, and a filter circuit, are interchangeable with the various primary-side configurations disclosed herein, which include a primary side of a transformer circuit, a resonant tank circuit, and a switching bridge.

Figures 3A, 3B:
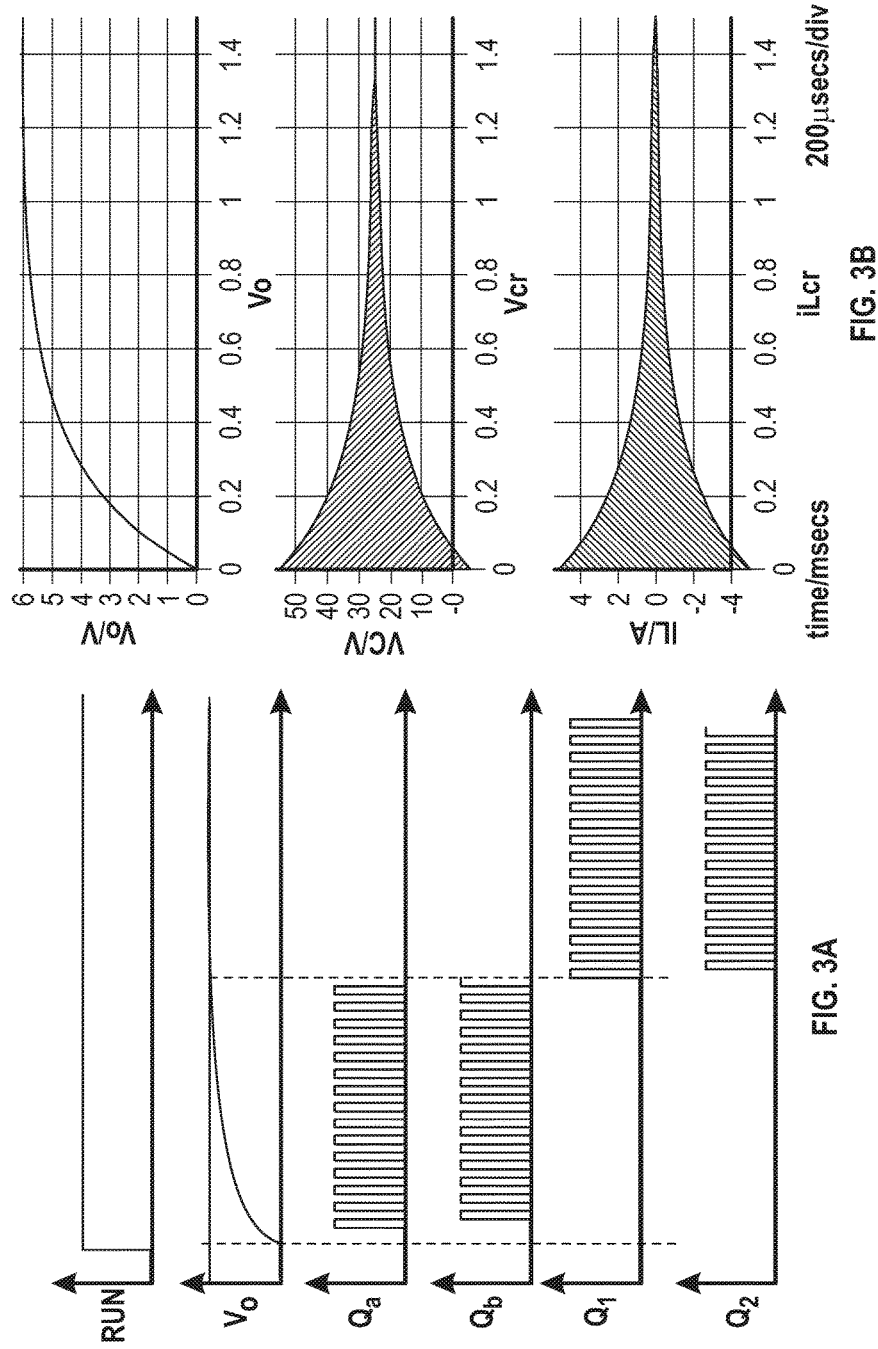
FIGS. 3A, 3B, and 3C illustrate exemplary control signals and results obtained in simulations applying the control signals to a model of the exemplary half-bridge soft start-up switched resonant power converter of FIG. 2.
Figure 3C:
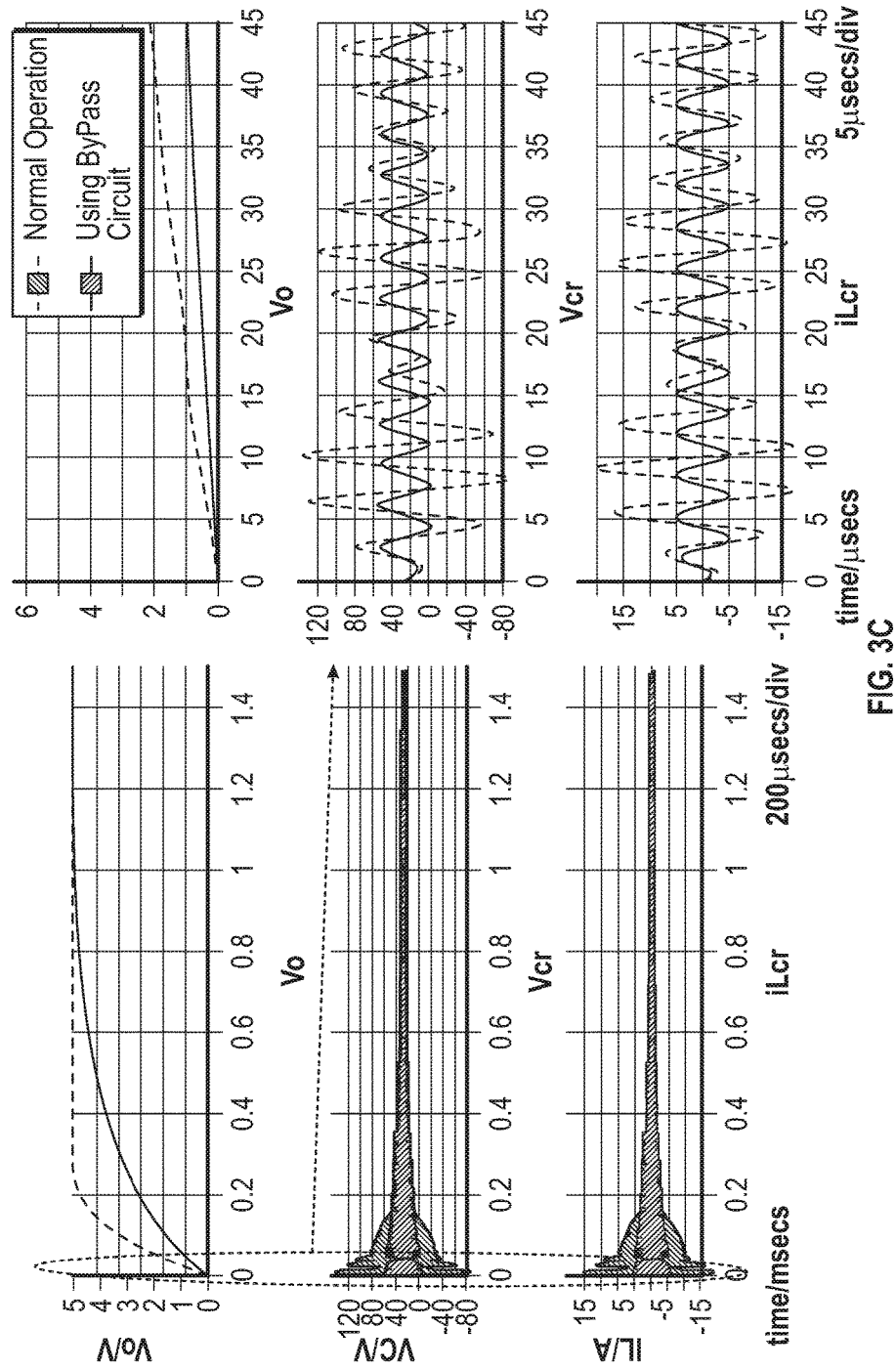

FIGS. 3A, 3B, and 3C illustrate exemplary control signals and results obtained in simulations applying the control signals to a model of the exemplary half-bridge soft start-up switched resonant power converter of FIG. 2. FIG. 3A depicts the relationship between start-up of converter 200. Vo, and the switching of auxiliary transistors Qa and Qb of bypass drive circuit 206 and of transistors Q1 and Q2 of switching bridge 204. Prior to start-up of converter 200, switching transistors Q1 and Q2, and auxiliary transistors Qa and Qb, may be switched off. The depicted optional soft-start trigger signal RUN represents the start-up of resonant power converter 200. RUN may be received at I/O interface 210 of control circuit 208, for example, to initiate the start-up of the converter.

According to the simulation, soft-start trigger signal RUN initiates control circuit 208 to begin switching operations according to a predetermined switching cycle (e.g., at a predetermined switching frequency and/or duty cycle). In a normal "operational mode," Q1 and Q2 are switched at a predetermined frequency and duty cycle set by the switching cycle. According to various implementations, at start-up, control circuit 208 delays the transmission of TC control signals and begins transmission of BC control signals, thereby activating bypass drive circuit 202 in place of a deactivated switching bridge 204 for a period of time. In this regard. FIG. 3A depicts Qa and Qb being switched on and off complimentary to each other, in place of Q1 and Q2, respectively, during this initial period of time.

With further reference to FIG. 3A, Control circuit 208 may be configured to monitor the frequency of resonant circuit 206 and deactivate bypass drive circuit 202 and activate switching bridge 204 when the operating frequency Fsw of the circuit reaches a frequency equal to or within a predetermined threshold range of the circuit's resonant frequency Fr (e.g., when Fsw=Fr). This timing may coincide with Vo reaching a predetermined operating value, or within a threshold range of its operating value. Accordingly, control circuit 208 may be additionally or alternatively configured to monitor Vo and deactivate bypass drive circuit 202 and activate switching bridge 204 when Vo reaches a predetermining operating voltage or within a threshold range of the operating voltage. Additionally or in the alternative, control circuit 208 may be configured to monitor a current (e.g., of an output current of the converter Io) and deactivate bypass drive circuit 202 and activate switching bridge 204 when the current reaches a predetermining operating current or within a threshold range of the operating current.

FIG. 3B depicts a simulated voltage and current response of switched resonant power converter of FIG. 2 when converter 200 of FIG. 2 is operated according to the switching depicted in FIG. 3A. As described previously with regard to FIG. 1A, a resonant power converter may be configured to convert a Vin of 48 volts to a Vo of 6 volts. In this configuration. Lr may be about 4.24 uH and Cr may be about 100 nF, and the switching frequency may be set to 300 kHz, with a primary side to secondary side turn ratio (np:ns) of 4:1. Without the activation of bypass drive circuit 202, a start-up of converter 200 (configured in this manner) may produce a capacitor voltage Vcr as high as 130 volts and a current iLcr across the inductor of more than 20 amps.

In the depicted simulation, bypass drive circuit 202 includes a 5 ohm resistor as the impedance element. When switching bridge 204 is deactivated and bypass drive circuit 202 is activated (e.g., when Qa and Qb are switched in place of Q1 and Q2, respectively), the converter produces a voltage Vcr across the capacitor Cr of about 60 volts and an inductor current iLcr across the inductor Lr of about 5 amps.

FIG. 3C depicts a comparison of a first start-up of resonant power converter 200 (in the foregoing configuration) under normal operation and without activation of bypass drive circuit 202, with a second start-up of converter 200 utilizing the bypass operation of bypass drive circuit 202. When switching bridge 204 is deactivated and bypass drive circuit 202 is activated (e.g., when Qa and Qb are switched in place of Q1 and Q2, respectively), the converter produces a substantially reduced voltage across the capacitor (e.g., 60 volts<130 volts) and a substantially reduced inductor current (e.g., 5 amps<20 amps) than the previously-described start-up under normal operation of switching bridge 204. Accordingly, reactive stress of the resonant circuit is substantially reduced during a start-up of the converter.

Figure 4:
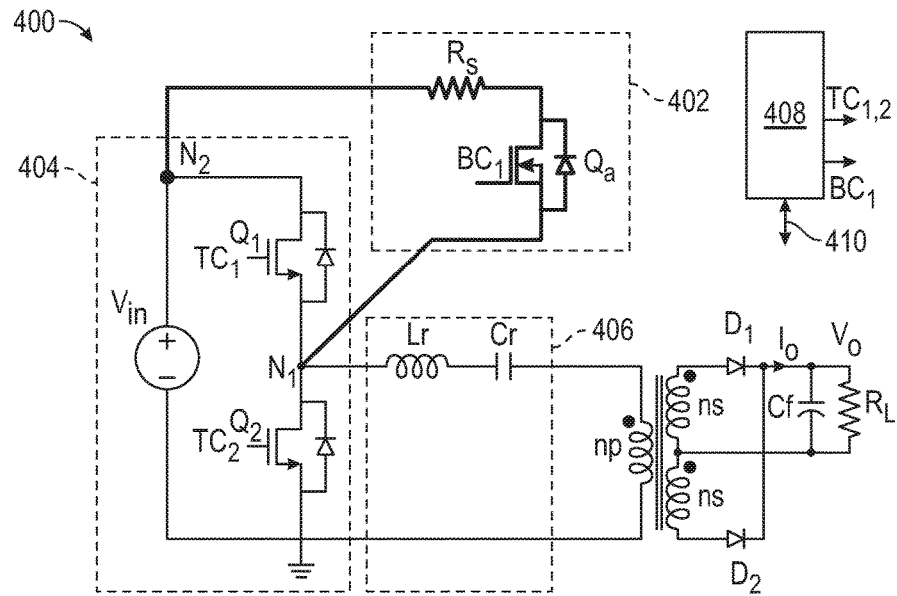
FIG. 4 is a diagram of an exemplary half-bridge soft start-up switched resonant power converter, including an exemplary single transistor bypass drive circuit.

FIG. 4 is a diagram of an exemplary half-bridge soft start-up switched resonant power converter 400, including an exemplary single transistor bypass drive circuit 402. In the depicted example, converter 400 includes a switching bridge 404 (e.g., in a half bridge configuration) with switching transistors Q1 and Q2 connected in series between a first terminal of a power source Vin (e.g., its cathode) and second terminal of the power source (e.g., its anode). In the depicted example, the second terminal is a ground. Vin may be a direct current (DC) power source, providing a DC voltage. Converter 400 includes a resonant circuit 406 connected between a first node N which links switching transistors Q1 and Q2 and the second terminal (e.g., ground). In the depicted example, resonant circuit 406 is depicted as a series resonant circuit with an inductor Lr and a capacitor Cr in series and, in normal operational mode, operates as described with regard to tank circuit 104 of FIG. 1A. It is understood that resonant circuit 406 may be configured according to any resonant circuit disclosed herein (e.g., as depicted in FIG. 1B, 1C, etc.).

Bypass drive circuit 402 is connected in parallel with switching transistor Q1, which in the depicted example is the primary switching transistor in switching bridge 204. In accordance with various implementations, bypass drive circuit 402 includes one auxiliary transistor Qa and an impedance element Rs. In the depicted example. Qa is connected in series with impedance element Rs. Bypass drive circuit 402 is connected between a first node N1 which links Q1 and Q2, and a second node N2 which links Vin with Q1 (e.g., at the drain of Q1). While, impedance Rs is shown connected to the drain of Qa, an impedance element Rs may be additionally or alternatively connected at the source of Qa (e.g., on the opposite side). Some implementations may include two impedance elements, one on each side of Qa. Bypass drive circuit 402 provides an auxiliary circuit path in parallel to and bypassing switching transistor Q1, through impedance element Rs to the resonant circuit when Qa of bypass circuit 402 is activated and Q1 is deactivated. While impedance element Rs is shown as a resistor, impedance element Rs may be replaced with an inductor or a combination of one or more resistors and one or more inductors.

Resonant power converter 400 may include a control circuit 408 configured to switch converter 400 between an operational mode in which auxiliary soft-start bypass drive circuit 402 is deactivated and the Q1 and Q2 of switching bridge 404 are switched according to a switching cycle to provide a first frequency-responsive power through the resonant circuit 406, and a soft-start mode in which the auxiliary soft-start bypass drive circuit 402 is activated and Qa is switched according to the switching cycle in place of Q1 provide a second frequency-responsive power through resonant circuit 406. Control circuit 408 may operate as described with regard to FIG. 2, and Q1 and Qa may be switched according to the switching cycle represented in FIG. 3A, while Q2 is switched continuously from start-up, complementary to Qa and Q1.

Figure 5:
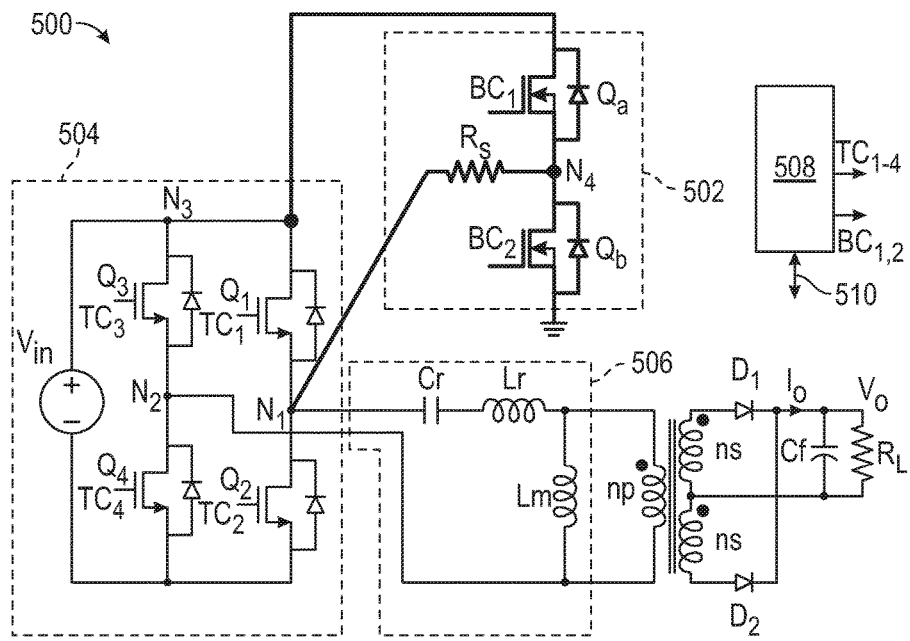
FIG. 5 is a diagram of an exemplary full-bridge soft start-up switched resonant power converter, including an exemplary half-bridge bypass drive circuit.

FIG. 5 is a diagram of an exemplary full-bridge soft start-up switched resonant power converter 500, including an exemplary half-bridge bypass drive circuit 502. Resonant power converter 500 includes a full switching bridge 504 with switching transistors Q1 and Q2 connected in series between a first terminal of a power source Vin (e.g., its cathode) and second terminal of the power source (e.g., its anode), and with switching transistors Q3 and Q4 also in series between the first and second terminals. Both strings are in parallel with each other between the first and second terminals. The second terminal may be a ground.

Resonant power converter 500 includes a resonant circuit 506 connected between a first node N1 which links switching transistors Q1 and Q2 and a second node N2 that links transistors Q3 and Q4. In the depicted example, resonant circuit 506 includes a capacitor Cr, a first inductor Lr, and a second inductor Lm connected in parallel with a load (represented by, e.g., the secondary circuit, including $R_L$). Resonant circuit 506 may implement other configurations of inductor(s) and capacitor(s) disclosed herein (e.g., an LLC circuit or the series resonant tank circuit of FIG. 1A).

Bypass drive circuit 502 is connected between second node N1 which links Q1 and Q2, and a third node N3 which links Vin with Q1 and/or Q3 (e.g., at the drain of Q1/Q3). Bypass drive circuit 502 includes two auxiliary transistors. Qa and Qb, and an impedance element Rs. Impedance element Rs is connected between node N1 and a fourth node N4 linking Qa and Qb. Auxiliary soft-start bypass drive circuit 502 provides an auxiliary circuit path in parallel to and bypassing switching transistor Q1, through impedance element Rs to the resonant circuit when Qa of bypass circuit 502 is activated and Q1 is deactivated. While impedance element Rs is shown as a resistor, impedance element Rs may be replaced with an inductor or a combination of one or more resistors and one or more inductors.

Resonant power converter 500 may include, as depicted in FIG. 5, a control circuit 508 configured to switch converter 500 between an operational mode in which auxiliary soft-start bypass drive circuit 502 is deactivated and switching transistors Q1-Q4 of switching bridge 504 are switched according to a switching cycle (e.g., to provide a first frequency-responsive power through the resonant circuit 506), and a soft-start mode in which the auxiliary soft-start bypass drive circuit 202 is activated and Qa and Qb are switched according to the switching cycle in place of Q1 and Q2 (e.g., to provide a second frequency-responsive power through resonant circuit 506). Control circuit 508 may switch auxiliary transistor Qa according to the switching cycle in place of switching transistor Q1, and may switch auxiliary transistor Qb according to the switching cycle in place of switching transistor Q2.

As described previously, control circuit 508 may be a pulse-width modulation (PWM) controller that generates PWM signals to switching bridge 504 to switch switching transistors Q1 through Q4 of the bridge on and off according to a set switching frequency and/or duty cycle. In this regard, control circuit 508 may include an input/output (I/O) interface 510, and may be programmed (e.g., before start-up of the converter) with a predetermined switching frequency and/or duty cycle, for example, by way of the I/O interface. During normal operational mode, Q and Q4 are periodically switched together, and complementary to the switching of Q2 and Q3, which are also switched together. When Q1 and Q4 are activated and Q2 and Q3 are deactivated according to the switching cycle, current flows in a first (e.g., clockwise) direction through resonant circuit 506. When Q2 and Q3 are activated and Q1 and Q4 are deactivated, current flows in an opposing (e.g., counterclockwise) direction through resonant circuit 506.

Control circuit 508 may operate as described with regard to FIG. 2, but with switching transistor control signals TC1 through TC4 being transmitted to operate the full-bridge configuration of switching transistors Q1 through Q4. In this regard, TC through TC4 are transmitted at a first voltage by control circuit 508 to the gates of switching transistors Q1 through Q4 to switch on Q1 through Q4, respectively, and transmitted at a second voltage (e.g., zero volts) to switch off the transistors. Likewise, bypass control signals BC1 through BC2 may be transmitted by control circuit 508 at a first voltage to switch on switching transistors Qa and Qb, respectively, and transmitted at a second voltage to switch off the transistors. When control circuit 508 is actively transmitting control signals TC the switching bridge 504 (and/or its switching transistors) is considered to be in the active state. When control circuit 508 is actively transmitting control signals BC the bypass drive circuit 502 is considered to be in the active state. When no signals are transmitted to a component (or transmitted at the second voltage) the corresponding component(s) is considered to be in the deactivated state.

Figure 6:
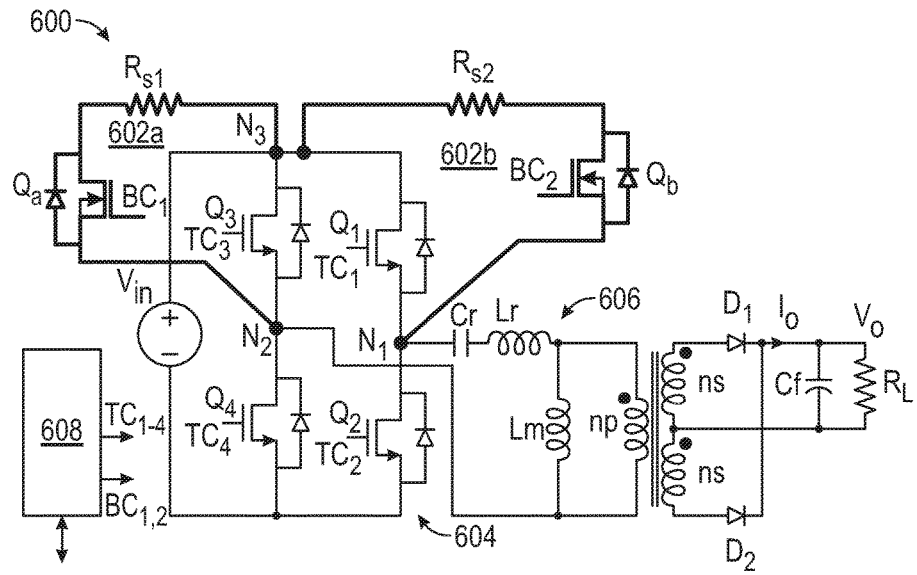
FIG. 6 is a diagram of a first exemplary full-bridge soft start-up switched resonant power converter, including multiple exemplary single transistor bypass drive circuits.

FIG. 6 is a diagram of a first exemplary full-bridge soft start-up switched resonant power converter 600, including multiple exemplary single transistor bypass drive circuits. The depicted example utilizes a combination of switching bridge 504 of FIG. 5 and multiple of the single transistor bypass drive circuits described with regard to FIG. 4. Resonant power converter 600 includes a full switching bridge 604 with switching transistors Q1 and Q2 connected in series between a first terminal of a power source Vin (e.g., its cathode) and a second terminal of the power source (e.g., its anode), and with switching transistors Q3 and Q4 also in series between the first and second terminals. Both strings of transistors are in parallel between the first and second terminals. The second terminal may be a ground.

Resonant power converter 600 includes a resonant circuit 606 connected between a first node N1 which links switching transistors Q1 and Q2 and a second node N2 that links transistors Q3 and Q4. In the depicted example, resonant circuit 606 includes a capacitor Cr, a first inductor Lr. and a second inductor Lm connected in parallel with a load (represented by, e.g., the secondary circuit, including $R_L$). Resonant circuit 606 may implement other configurations of inductor(s) and capacitor(s) disclosed herein (e.g., an LLC circuit or the series resonant tank circuit of FIG. 1A).

A first bypass drive circuit 602a is connected in parallel with switching transistor Q3. In accordance with various implementations, first bypass drive circuit 602a includes one auxiliary transistor Qa and an impedance element Rs1. In the depicted example, Qa is connected in series with impedance element Rs1. Bypass drive circuit 602a is connected between second node N2 which links Q3 and Q4, and a third node N3 which links Vin with Q3 (e.g., at the drain of Q3). While, impedance element Rs1 is shown connected to the drain of Qa, impedance element Rs1 may be connected at the source of Qa. Some implementations may include two impedance elements, one on each side of Qa. Bypass drive circuit 602a provides an auxiliary circuit path in parallel to and bypassing switching transistor Q3, through impedance element Rs1 to the resonant circuit when Qa of bypass circuit 602a is activated and Q3 is deactivated. While impedance element Rs1 is shown as a resistor, impedance element Rs1 may be replaced with an inductor or a combination of one or more resistors and one or more inductors.

A second bypass drive circuit 602b is connected in parallel with switching transistor Q1. In accordance with various implementations, second bypass drive circuit 602b includes one auxiliary transistor Qb and an impedance element Rs2. In the depicted example, Qb is connected in series with impedance element Rs2. Bypass drive circuit 602b is connected between first node N1 which links Q1 and Q2, and third node N3 (shown as two nodes in FIG. 6) which links Vin with Q1 (e.g., at the drain of Q1). While, impedance element Rs2 is shown connected to the drain of Qb, impedance element Rs2 may be connected at the source of Qb. Some implementations may include two impedance elements, one on each side of Qb. Bypass drive circuit 602b provides an auxiliary circuit path in parallel to and bypassing switching transistor Q1, through impedance element Rs2 to the resonant circuit when Qb of bypass circuit 602b is activated and Q1 is deactivated. While impedance element Rs2 is shown as a resistor, impedance element Rs2 may be replaced with an inductor or a combination of one or more resistors and one or more inductors.

Control circuit 608 may operate as described previously with regard to FIGS. 2 through 5, but with switching transistor control signals TC1 through TC4 being transmitted to operate the full-bridge configuration of switching transistors Q1 through Q4. In this regard, TC1 through TC4 are transmitted at a first voltage by control circuit 608 to the gates of switching transistors Q1 through Q4 to switch on Q1 through Q4, respectively, and transmitted at a second voltage (e.g., zero volts) to switch off the transistors. During normal operational mode, Q1 and Q4 are periodically switched together, and complementary to the switching of Q2 and Q3, which are also switched together. When Q1 and Q4 are activated and Q2 and Q3 are deactivated according to the switching cycle, current flows in a first (e.g., clockwise) direction through resonant circuit 606. When Q2 and Q3 are activated and Q1 and Q4 are deactivated, current flows in an opposing (e.g., counterclockwise) direction through resonant circuit 606.

Bypass control signals BC1 through BC2 may be transmitted by control circuit 508 at a first voltage to switch on switching transistors Qa and Qb, respectively, and transmitted at a second voltage to switch off the transistors. Qa may be switched on and off according to the switching cycle in place of Q3, and Qb may be switched on and off in place of Q1. First drive bypass drive circuit 602a and second bypass drive circuit 602b may be collectively referred to as a single bypass drive circuit 602ab for the purposes of activation and deactivation. For example, when control circuit 608 is actively transmitting control signals BC to Qa and/or Qb both bypass drive circuits 602a and 602b are considered to be in the active state. When control circuit 608 is actively transmitting control signals TC the switching bridge 604 (and/or its switching transistors) the switching bridge is considered to be in the active state. When no signals are transmitted to a component (or transmitted at the second voltage) the corresponding component(s) is considered to be in the deactivated state.

Figure 7:
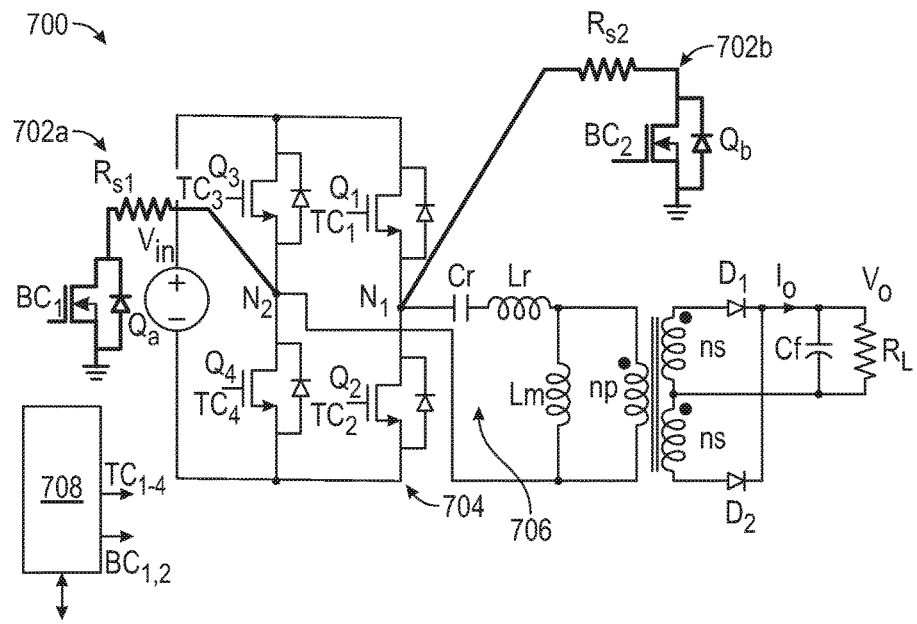
FIG. 7 is a diagram of a second exemplary full-bridge soft start-up switched resonant power converter, including multiple exemplary single transistor bypass drive circuits.

FIG. 7 is a diagram of a second exemplary full-bridge soft start-up switched resonant power converter 700, including multiple exemplary single transistor bypass drive circuits. The depicted example utilizes a combination of switching bridge 604 of FIG. 6 and multiple single transistor bypass drive circuits 702a and 702b. In this regard, resonant power converter 700 includes a full switching bridge 704 with switching transistors Q1 and Q2 connected in series between a first terminal of a power source Vin (e.g., its cathode) and second terminal of the power source (e.g., its anode), and with switching transistors Q3 and Q4 also in series between the first and second terminals. Both strings are in parallel between the first and second terminals. The second terminal may be a ground.

Resonant power converter 700 includes a resonant circuit 706 connected between a first node N1 which links switching transistors Q1 and Q2 and a second node N2 that links transistors Q3 and Q4. In the depicted example, resonant circuit 706 includes a capacitor Cr, a first inductor Lr, and a second inductor Lm connected in parallel with a load (represented by, e.g., the secondary circuit, including $R_L$). Resonant circuit 706 may implement other configurations of inductor(s) and capacitor(s) disclosed herein (e.g., an LLC circuit or the series resonant tank circuit of FIG. 1A).

As shown by FIG. 7, single transistor bypass drive circuits 702a and 702b may be utilized in place of Q2 and Q4 during a soft start of resonant power converter 700. In accordance with various implementations, a first bypass drive circuit 702a includes one auxiliary transistor Qa and an impedance element Rs1. In the depicted example, Qa is connected in series with impedance element Rs1. In the depicted example, bypass drive circuit 702a is connected between second node N2 and a ground. In some implementations, bypass drive circuit 702a may be connected between second node N2 and the second terminal of the power source (e.g., at the anode). While, impedance element Rs1 is shown connected to the drain of Qa, impedance element Rs may be connected at the source of Qa. Some implementations may include two impedance elements, one on each side of Qa. Bypass drive circuit 702a may provide an auxiliary circuit path in parallel to switching transistor Q4, and bypassing switching transistor Q4 through impedance element Rs to the resonant circuit when Qa of bypass circuit 702a is activated and Q4 is deactivated. While impedance element Rs1 is shown as a resistor, impedance element Rs1 may be replaced with an inductor or a combination of one or more resistors and one or more inductors.

A second bypass drive circuit 702b includes one auxiliary transistor Qb and an impedance element Rs2. In the depicted example, Qb is connected in series with impedance element Rs2. Bypass drive circuit 702b is connected between first node N1 and ground. In some implementations, bypass drive circuit 702b may be connected between first node N1 and the second terminal of the power source (e.g., at the anode). While, impedance element Rs2 is shown connected to the drain of Qb, impedance element Rs2 may be connected at the source of Qb. Some implementations may include two impedance elements, one on each side of Qb. Bypass drive circuit 702b may provide an auxiliary circuit path in parallel to switching transistor Q2, and bypassing switching transistor Q2 through impedance element Rs2 to the resonant circuit when Qb of bypass circuit 702b is activated and Q2 is deactivated. While impedance element Rs2 is shown as a resistor, impedance element Rs2 may be replaced with an inductor or a combination of one or more resistors and one or more inductors.

Resonant power converter 700 may include a control circuit 708 that operates as described previously with regard to FIGS. 2 through 6, but with switching transistor control signals TC1 through TC4 being transmitted to operate the full-bridge configuration of switching transistors Q1 through Q4. In this regard, TC1 through TC4 are transmitted at a first voltage by control circuit 708 to the gates of switching transistors Q1 through Q4 to switch on Q1 through Q4, respectively, and transmitted at a second voltage (e.g., zero volts) to switch off the transistors. During normal operational mode. Q1 and Q4 are periodically switched together, and complementary to the switching of Q2 and Q3, which are also switched together. When Q1 and Q4 are activated and Q2 and Q3 are deactivated according to the switching cycle, current flows in a first (e.g., clockwise) direction through resonant circuit 706. When Q2 and Q3 are activated and Q1 and Q4 are deactivated, current flows in an opposing (e.g., counterclockwise) direction through resonant circuit 706.

Bypass control signals BC1 through BC2 may be transmitted by control circuit 708 at a first voltage to switch on switching transistors Qa and Qb, respectively, and transmitted at a second voltage to switch off the transistors. Qa may be switched on and off according to the switching cycle in place of Q4, and Qb may be switched on and off in place of Q2. First drive bypass drive circuit 702a and second bypass drive circuit 702b may be collectively referred to as a single bypass drive circuit 702ab for the purposes of activation and deactivation. For example, when control circuit 708 is actively transmitting control signals BC to Qa and/or Qb both bypass drive circuits 702a and 702b are considered to be in the active state. When control circuit 708 is actively transmitting control signals TC the switching bridge 704 (and/or its switching transistors) the switching bridge is considered to be in the active state. When no signals are transmitted to a component (or transmitted at the second voltage) the corresponding component(s) is considered to be in the deactivated state.

Figure 8A:
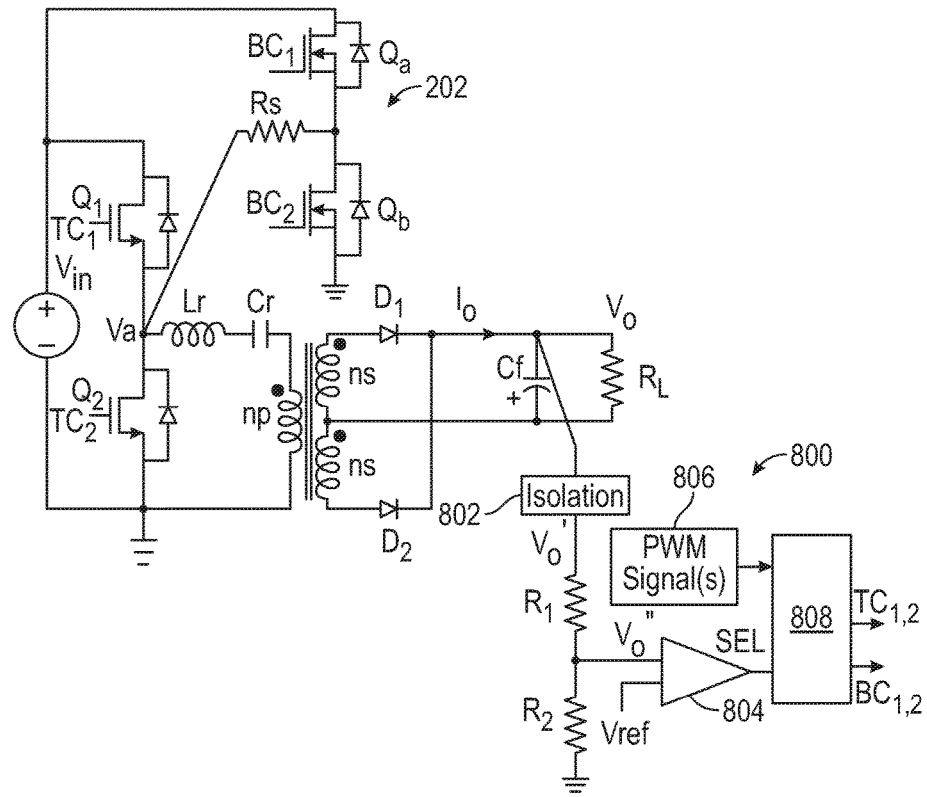
FIGS. 8A and 8B illustrate an exemplary selection circuit and parameters for selecting between an operational mode in which a bypass drive circuit is deactivated and a primary drive circuit is activated, and a soft-start mode in which the bypass drive circuit is activated and the primary drive circuit is deactivated.
Figure 8B:
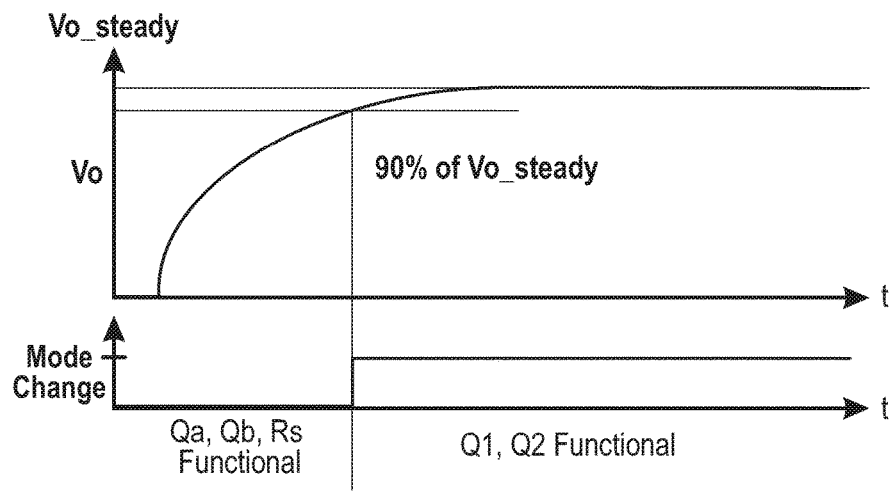

FIGS. 8A and 8B illustrate an exemplary selection circuit 800 and parameters for selecting between an operational mode in which a bypass drive circuit is deactivated and a primary drive circuit is activated, and a soft-start mode in which the bypass drive circuit is activated and the primary drive circuit is deactivated. For exemplary purposes, selection circuit 800 of FIG. 8A is depicted as being implemented with the resonant power converter 200 of FIG. 2. Selection circuit 800, without limitation, may be implemented in any converter circuit described herein.

In some implementations, selection circuit 800 monitors the output voltage Vo at the secondary side of the computer to determine whether the converter should be switched from the soft-start mode to the operational mode (e.g., when soft-starting of the resonant power converter is completed), or vice versa. As shown by FIG. 8B the mode is changed with Vo reaches 90% of an expected steady state voltage Vo_steady.

According to various implementations, the voltage potential at the secondary side will be different than at the primary side. In this regard, as depicted in FIG. 8A, selection circuit 800 may implement an isolation circuit 802 to isolate selection circuit 800 from the secondary side of the converter. Isolation circuit 802 may include, for example, an opti-isolator (e.g., optical coupler/optocoupler, photocoupler, etc.) that transfers the output voltage Vo to selection circuit 800 as Vo' using light signals.

Voltage Vo' (representative of Vo) is received by selection circuit 800 (e.g., via isolation circuit 802) and provided to a voltage divider represented by R1 and R2. A comparator 804 receives the divided voltage Vo" at a first input, which is then compared to a reference value Vref received at a second input. According to various implementations, reference value Vref and values of R1 and R2 (e.g., in ohms), set a threshold at which the converter is to be switched from the soft-start mode to the operational mode (e.g., when start-up of the resonant power converter is completed), or vice versa. R1 and R2 may be variable resistors. In this regard, the values of Vref and/or R1 and/or R2 may be changed (e.g., by control circuit 208 via I/O interface 210) to vary the threshold. Based on the received values, comparator outputs a selection signal SEL which designates the selected mode.

A PWM signal 806 may be provided by a control circuit (e.g., control circuit 208) or clock source (not shown) for switching of the transistors (e.g., Q1 and Q2) within the switching bridge. During the operational mode, Q1 is switched complimentary to Q2. In this regard, each pair of switching signals (e.g., TC1 for Q1 and TC2 for Q2) may be generated by inverting the PWM signal, and passing the inverted signal together with the original PWM signal.

A multiplexer 804 receives PWM signal(s) 806 and, based on the state (e.g., voltage) of selection signal SEL, directs the signal(s) to corresponding default switching transistors (e.g., switching transistor Q1 and/or Q2) during an operational mode, or corresponding bypass transistor(s) (e.g., auxiliary bypass signals Q1 and/or Q2) during a soft-start mode. In the depicted example, when bypass drive circuit 202 is activated and switching bridge 204 is deactivated (e.g., when SEL is set to a first state), multiplexer 804 transmits BC1 and BC2 according to the set switching cycle. When bypass drive circuit 202 is deactivated and switching bridge 204 is activated (e.g., when SEL is to a second state), multiplexer 804 switches to transmitting TC1 and TC2 according to the set switching cycle.

In some implementations, selection circuit 800 may be implemented at the primary side of the converter. In this configuration, selection circuit may monitor a voltage or current in the resonant circuit and switch modes based on the monitored voltage or current. Additionally or in the alternative, selection circuit 800 may be configured to monitor a frequency of the resonant circuit, and switch modes when the monitored frequency reaches or is within a threshold percentage of a target frequency (e.g., the resonant frequency of the circuit).

Figure 9:
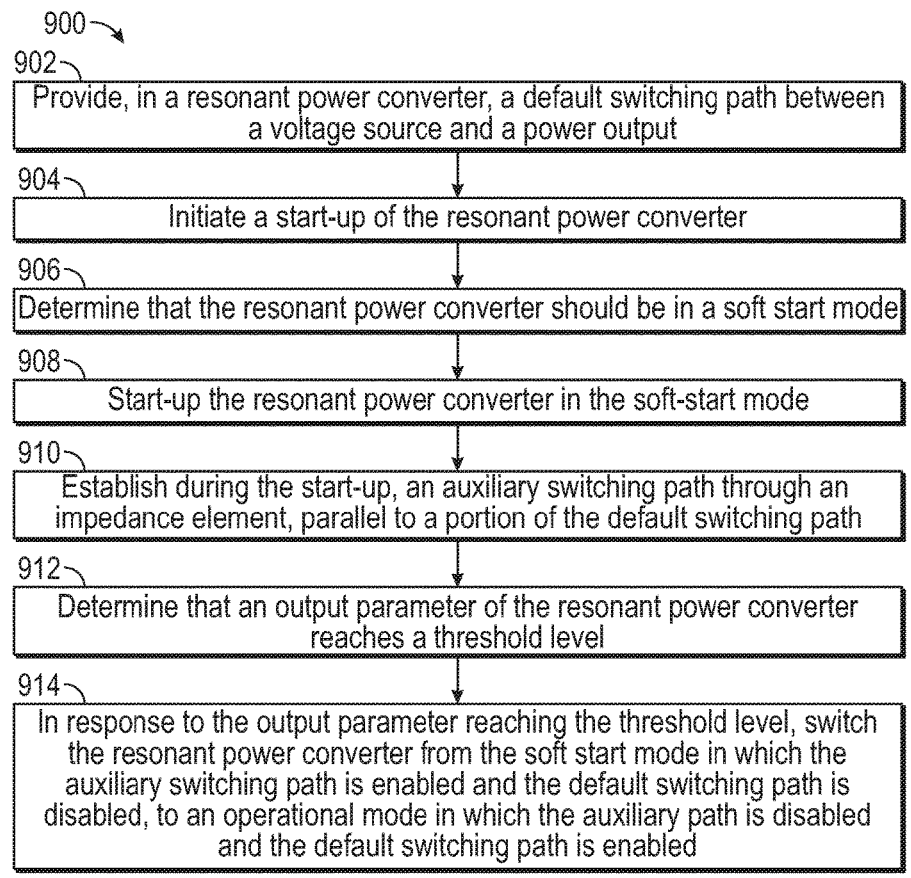
FIG. 9 is a flowchart of an exemplary process for limiting high voltage and high in-rush current in a switched resonant converter circuit.

FIG. 9 is a flowchart of an exemplary process 900 for limiting high voltage and in-rush current in a resonant power converter circuit, according to various implementations described herein. For explanatory purposes, the various blocks of exemplary process 900 are described herein with reference to FIGS. 2-8, and the components and/or processes described herein. The one or more of the blocks of process 900 may be implemented, for example, by any of the various resonant power converter circuits described herein. In some implementations, one or more of the blocks may be implemented apart from other blocks, and by one or more different processors or devices. Further for explanatory purposes, the blocks of exemplary process 900 are described as occurring in serial, or linearly. However, multiple blocks of exemplary process 900 may occur in parallel. In addition, the blocks of exemplary process 900 need not be performed in the order shown and/or one or more of the blocks of exemplary process 900 need not be performed.

In the depicted exemplary flow diagram, a default switching path between a voltage source and a power output is provided in a resonant power converter (902). As described previously, the default switching path includes a plurality of switching transistors in a switching bridge that are switched according to a switching cycle when the converter is in an operational mode. When the switching transistors are switched according to the switching cycle, and the power output of the resonant power converter is connected to a load, the resonant power converter will ultimately produce a first frequency-responsive power to the load. This first power may include a steady state voltage Vo_steady and/or a steady state current Io_steady, or a voltage and/or current within a tolerance of the steady state. The steady state may be obtained, for example, when the resonant circuit reaches a resonant frequency Fr (e.g., when Fsw=Fr).

A start-up of the resonant power converter is initiated during which a modulated signal is received at a switching bridge of the resonant power converter circuit (904). In response to the start-up of the resonant power converter circuit, a determination is made that the resonant power converter circuit should be in a soft-start mode (906) instead of the operational mode, and the resonant power converter circuit is placed in the soft-start mode (908). The determination may be made based on, for example, an output parameter of the resonant power converter satisfying a first threshold level (e.g., Vo substantially equal to zero). According to various aspects, the converter may be switched to the soft-start mode at start-up, or may already be in the soft-start mode by default.

When the converter is in the soft-start mode, an auxiliary switching path through an impedance element is established during the start-up of the resonant power converter, the auxiliary path being parallel to a portion of the default switching path (910). During the soft-start mode, one or more auxiliary transistors in the auxiliary path are switched on and off in place of one or more of the switching transistors in the default switching path. When the auxiliary transistors are switched according to the switching cycle (e.g., in place of the default switching transistors), and the resonant power converter is connected to a load, the resonant power converter produces a second frequency-responsive power to the load. This second power may include a power that transitions toward the first frequency-responsive power, or within a tolerance of the first power. For example, as shown by FIG. 8B, the second power may include Vo, rising toward Vo_steady. The steady state may be obtained, for example, when the resonant circuit reaches a resonant frequency Fr.

In the depicted process, an output parameter of the converter is monitored by a selection circuit to determine when the output parameter reaches a predetermined threshold level (912). The threshold level may be a threshold power output by the resonant power converter (e.g., at the output node coupled to a load $R_L$). For example, the threshold level may be 90% of an expected output voltage Vo_steady. In some implementations, the output parameter includes a frequency. In response to the output parameter reaching the threshold level, the resonant power converter circuit is switched from the soft-start mode in which the auxiliary switching path is enabled and the default switching path is disabled, to an operational mode in which the auxiliary switching path is disabled and the default switching path is enabled (914).

Figure 10:
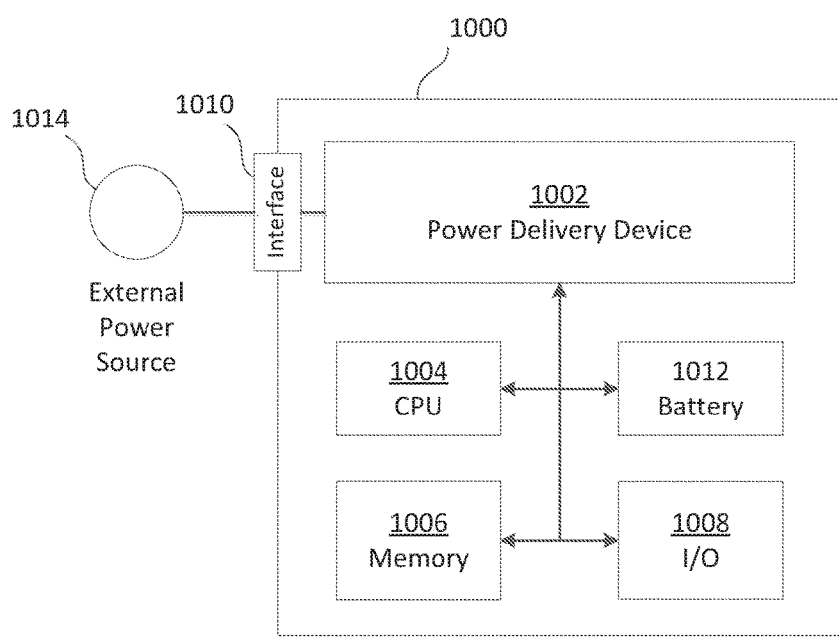
FIG. 10 is a diagram of an exemplary electronic system that implements a soft-start switched resonant power converter.

FIG. 10 is a diagram of an exemplary electronic system 1000 that implements a soft-start switched resonant power converter, according to various implementations described herein. Electronic system 1000, in combination with the disclosure regarding FIGS. 2-9, may be any electronic device utilizing power from a power source. For example, electronic system 1000 may be representative of a computing device (e.g., a personal computer or a mobile device such as a smartphone, tablet computer, laptop, PDA, a wearable such as a watch or band, or combination thereof), or a consumer appliance, television or other display device, radio or telephone, home audio system, or the like.

In some implementations, electronic system may include a power delivery device 1002 (e.g., a power supply) and a load. The load may include various components of system 1000, including one or more of a central processing unit (CPU) 1004, various memory systems 1006, one or more input and/or output (I/O) devices 1008, a power interface 1010, and one or more batteries 1012. The CPU 1000 may be a multi-core processor, a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

A memory system 1006 may include, for example, volatile memory used to temporarily store data and information used to manage electronic system 1000, a random access memory (RAM), and/or non-volatile memory such as a magnetic disk, flash memory, peripheral SSD, and the like. I/O device 10008 may include an input device such as a keyboard, a touch screen, a touch pad, voice control system, or other device for input of data. I/O device 1008 may include an output device such as a display device, audio device (e.g., a speaker), or data interface (e.g., a host data bus) for output of data. In some implementations, one or more elements of electronic system 1000 can be integrated into a single chip. In some implementations, the elements can be implemented on two or more discrete components.

Power delivery device 1002 may include any of the previously described resonant power converter circuits (including an auxiliary bypass circuit), including a corresponding control circuit. Accordingly, power delivery device 1002 may be configured (e.g., as a step up or step down converter) to convert a first voltage to a second voltage, different than the first voltage. Power delivery device 1002 may receive an input power (e.g., at a voltage Vin) from an external power source 1014 via power interface 1010. The input power may be a DC power. In some implementations, the input power may be an alternating current source that is converted to DC (e.g., by power interface 1010) before being utilized by power delivery device 1002. Additionally or in the alternative, the input power may be DC from battery 1012.

Power delivery device 1002 may produce a voltage according to the load requirements of various components of electronic device 1000. In this regard, power delivery device 1002 may implement multiple different types of converter circuits to accommodate different load requirements of the various components of electronic device 1000. Additionally or in the alternative, power delivery device 1002 may be configured to provide charge to battery 1012 (e.g., as part of a battery charger system) based on power from external power source 1014.

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the present disclosure.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the present disclosure, and the present disclosure is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a circuit or processor configured to monitor and control an operation or a component may also mean the circuit or processor being programmed to monitor and control the operation or being operable to monitor and control the operation. Likewise, a circuit or processor configured to execute code may be construed as a circuit or processor programmed to execute code or operable to execute code.

The terms "start-up" and "power-up" are intended to include, but not be limited to, the plain meaning of each respective term, and for the purposes of this disclosure may be used interchangeably. The terms "start-up" and "power-up" may include, for example, a point in time at which a circuit is turned on (e.g., started) and/or a period of time shortly thereafter.

A phrase such as an "aspect" does not imply that such aspect is essential to the present disclosure or that such aspect applies to all configurations of the present disclosure. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the present disclosure or that such implementation applies to all configurations of the present disclosure. A disclosure relating to an implementation may apply to all aspects, or one or more aspects. An implementation may provide one or more examples. A phrase such as an "implementation" may refer to one or more implementations and vice versa. A phrase such as a "configuration" does not imply that such configuration is essential to the present disclosure or that such configuration applies to all configurations of the present disclosure. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example, instance, or illustration." Any aspect described herein as "exemplary" is not necessarily to be construed as preferred or advantageous over other aspects. In addition, description of a feature, advantage or mode of operation in relation to an example combination of aspects does not require that all practices according to the combination include the discussed feature, advantage or mode of operation.

As used herein, the singular forms "a", "an" and "the" are intended to include the plural forms as well, unless the context clearly indicates otherwise. Numeric terms such as "first", "second", "third," etc., unless specifically stated, are not used herein to imply a particular ordering of the recited structures, components, capabilities, modes, steps, operations, or combinations thereof with which they are used.

The terms "comprise," "comprising," "includes," and "including", as used herein, specify the presence of one or more recited structures, components, capabilities, modes, steps, operations, or combinations thereof, but do not preclude the presence or addition of one or more other structures, components, capabilities, modes, steps, operations, or combinations thereof.

What is claimed is:

1. A switched resonant power converter, comprising:
  a plurality of switching transistors connected in series;
  a resonant circuit comprising a capacitor and an inductor, and connected at a first node linking two of the connected plurality of switching transistors;
  an auxiliary soft-start bypass circuit connected at the first node and comprising first and second auxiliary transistors and an impedance element, the auxiliary soft-start bypass circuit providing an auxiliary circuit path in parallel to a first switching transistor of the plurality of switching transistors and through the impedance element to the resonant circuit when the auxiliary soft-start bypass circuit is activated and the first switching transistor is deactivated; and
  a control circuit configured to switch to (1) an operational mode in which the auxiliary soft-start bypass circuit is deactivated and the plurality of switching transistors are switched according to a switching cycle to provide a first frequency-responsive power through the resonant circuit, from (2) a soft-start mode in which the auxiliary soft-start bypass circuit is activated and first and second auxiliary transistors are periodically switched on and off according to the switching cycle in place of the first and second switching transistors while the first and second switching transistors are deactivated to provide a second frequency-responsive power through the resonant circuit.

2. The switched resonant power converter of claim 1, wherein the impedance element comprises a resistor or an inductor.

3. The switched resonant power converter of claim 2, wherein the resonant circuit is a series resonant circuit, and the capacitor and the inductor of the resonant circuit are connected in series.

4. The switched resonant power converter of claim 2, wherein the resonant circuit is a parallel resonant circuit including two inductors and capacitor.

5. The switched resonant power converter of claim 1, wherein the first and second switching transistors are connected to each other in series at the first node, and wherein the first and second auxiliary transistors are connected to each other in series, and wherein the impedance element is connected between the first node and a second node linking the first and second auxiliary transistors, and wherein the control circuit is configured to, during the soft-start mode, switch the first auxiliary transistor on and off in place of the first switching transistor and switch the second auxiliary transistor on and off in place of a second switching transistor of the plurality of switching transistors, the first and second auxiliary transistors being switched on and off complimentary to each other.

6. The switched resonant power converter of claim 1, wherein the impedance element is connected in series with a first auxiliary transistor of the first and second auxiliary transistors, and wherein the control circuit is configured to, during the soft-start mode, switch the first auxiliary transistor on and off according to the switching cycle in place of the first switching transistor of the plurality of switching transistors while the first switching transistor is deactivated.

7. The switched resonant power converter of claim 6, wherein the first and second auxiliary transistors comprises a second auxiliary transistor connected in series with a second impedance element, the second auxiliary transistor and second impedance element providing a second auxiliary circuit path in parallel to a second switching transistor of the plurality of switching transistors, and wherein the control circuit is configured to, during the soft-start mode, switch the second auxiliary transistor on and off in place of a second switching transistor while the second switching transistor is deactivated, the first and second auxiliary transistors being switched on and off complimentary to each other.

8. The switched resonant power converter of claim 1, wherein the control circuit is configured to periodically switch the plurality of switching transistors according to the switching cycle during a start-up of the switched resonant power converter, and to switch to the operational mode when a threshold power level is detected at an output node of the switched resonant power converter.

9. The switched resonant power converter of claim 8, the switched resonant power converter further comprising:
  a transformer circuit;
  a rectifier circuit coupled to the resonant circuit via the transformer circuit; and
  an output capacitor,
  wherein the output node is coupled to a load, across the output capacitor.

10. A power system, comprising:
  a switched resonant converter, wherein the switched resonant converter comprises:
    a plurality of switching transistors connected in series;
    a resonant circuit comprising a capacitor and an inductor and connected at a first node linking two of the connected plurality of switching transistors;
    an auxiliary soft-start bypass circuit, including an impedance element and first and second auxiliary transistors, that bypasses a default switching path and that provides an alternative path to a first switching transistor of the plurality of switching transistors through the impedance element; and
    a control circuit configured to switch to (1) an operational mode in which the default switching path is periodically activated while the alternative path is deactivated to provide a first frequency-responsive power through the resonant circuit, from (2) a soft-start mode in which the alternative path is periodically activated while the default switching path is deactivated to provide a second frequency-responsive power through the resonant circuit,
    wherein the control circuit is configured to, during the soft-start mode, periodically switch the first auxiliary transistor on and off in place of the first switching transistor while the first switching transistor is deactivated, and periodically switch the second auxiliary transistor on and off in place of a second switching transistor of the plurality of switching transistors while the second switching transistor is deactivated, the first and second auxiliary transistors being switched on and off complimentary to each other.

11. The power system of claim 10, wherein the impedance element comprises a resistor or an inductor.

12. The power system of claim 11, wherein the resonant circuit is a series resonant circuit, and the capacitor and the inductor of the resonant circuit are connected in series.

13. The power system of claim 11, wherein the resonant circuit is a parallel resonant circuit including two inductors and capacitor.

14. The power system of claim 10, wherein the first and second switching transistors are connected to each other in series at the first node, and wherein the first and second auxiliary transistors are connected to each other in series, and wherein the impedance element is connected between the first node and a second node linking the first and second auxiliary transistors.

15. The power system of claim 10, wherein the impedance element is connected in series with the first auxiliary transistor, and wherein the auxiliary soft-start bypass circuit further comprises:
a second impedance element in series with the second auxiliary transistor and providing a second circuit path through the second impedance element and parallel to the second switching transistor during the soft-start mode.

16. The power system of claim 10, wherein the control circuit is configured to periodically switch the plurality of switching transistors according to a switching cycle during a start-up of the switched resonant converter, and to switch to the operational mode when a threshold power level is detected at an output node of the switched resonant converter.

17. The power system of claim 16, the switched resonant converter further comprising:
a transformer circuit;
a rectifier circuit coupled to the resonant circuit via the transformer circuit; and
an output capacitor,
wherein the output node is coupled to a load, across the output capacitor.

18. A switched resonant converter, comprising:
means for establishing a default switching path between a voltage source and a load, to provide a first frequency-responsive power to the load;
means for providing an auxiliary switching path through an impedance element, parallel to a portion of the default switching path, to provide a second frequency-responsive power to a load; and
means for switching between a soft-start mode in which the auxiliary switching path is enabled and the default switching path is disabled, and an operational mode in which the auxiliary switching path is disabled and the default switching path is enabled, the auxiliary switching path being enabled during a start-up of the switched resonant converter, and the default switching path being switched to enabled when an output of the switched resonant converter reaches a threshold power; and
means for periodically switching, during the soft-start mode, a first auxiliary transistor on and off in place of a first switching transistor while the first switching transistor is deactivated, and periodically switching a second auxiliary transistor on and off in place of a second switching transistor while the second switching transistor is deactivated, the first and second auxiliary transistors being switched on and off complimentary to each other.

19. The switched resonant converter of claim 18, further comprising:
wherein the first auxiliary transistor and the second auxiliary transistor are connected to each other in series, and the first switching transistor and the second switching transistor are connected to each other in series, and wherein the auxiliary switching path comprises impedance element connected between a first node linking the first and second auxiliary transistors, and a second node linking the first and second switching transistors.

* * * * *